3,075,218
SEWER SNAKE DRIVE
Karl J. Kollmann, 3615 Sassafras St., Erie, Pa.
Filed Feb. 4, 1960, Ser. No. 6,695
1 Claim. (Cl. 15—104.3)

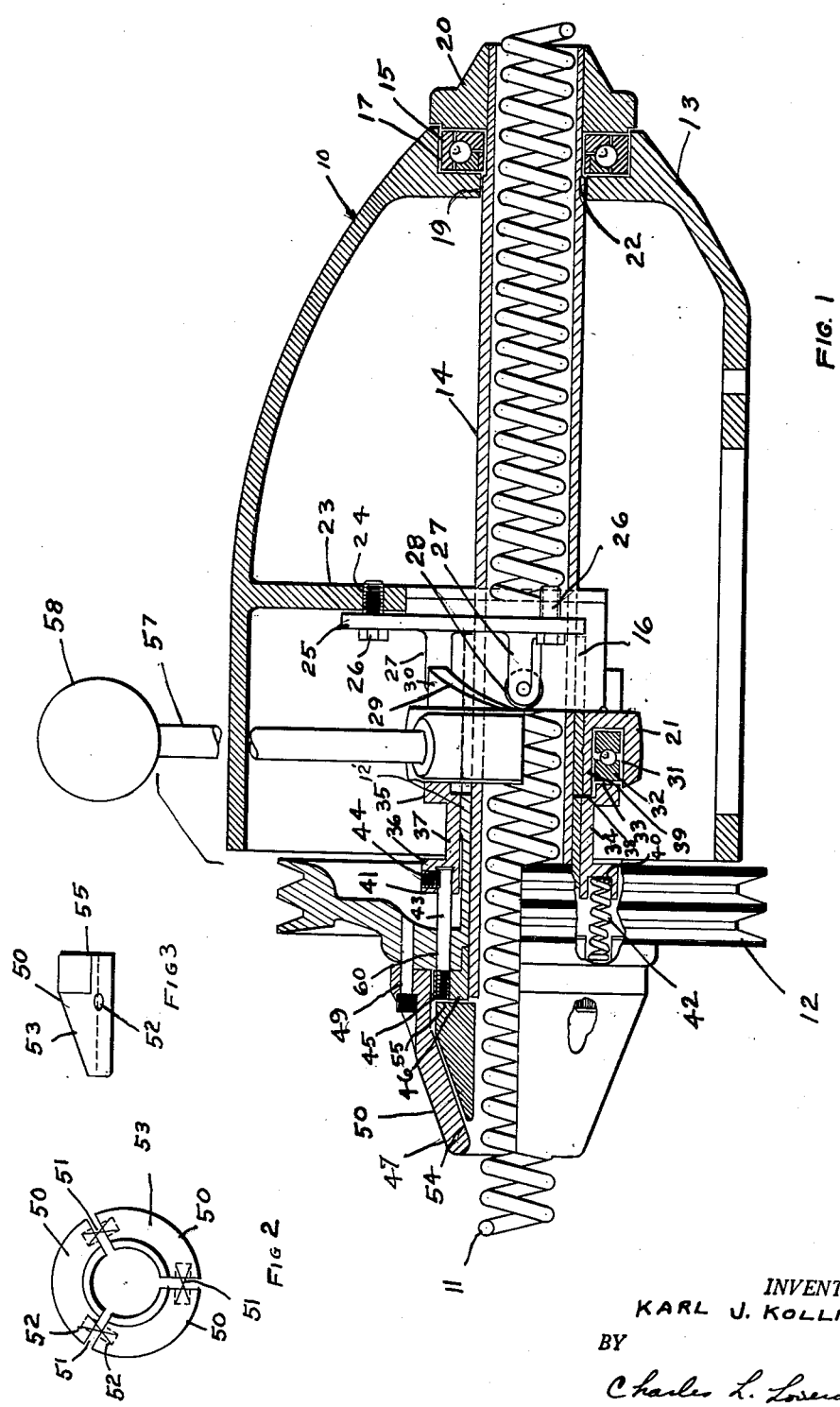

This invention relates to sewer cleaning machines and, more particularly, to the type of sewer cleaning machine wherein a sewer snake is rotated by power means with a cutter end thereof for removing obstructions from a sewer line.

Previous machines of the type disclosed herein were usually made up of a complicated array of parts.

It is, accordingly, an object of the present invention to provide a machine which is simple in construction, economical to manufacture, and simple and efficient to use.

Another object of the invention is to provide an improved sewer cleaning machine.

A further object of the invention is to provide a sewer cleaning machine in combination with an improved clutch and actuating means therefor.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a longitudinal cross sectional view of a sewer cleaning machine according to the invention;

FIG. 2 is a front view of the clutch jaws according to the invention; and

FIG. 3 is a side view of one of the clutch jaws.

Now with more specific reference to the drawing, a sewer cleaning machine 10 is shown having a sewer snake 11 of the usual type. The snake 11 as shown does not rotate when the clutch is disengaged but when the clutch is engaged, the snake 11 is rotated by a motor driving pulley 12 through a V-belt or the like. The pulley 12 is shown having two grooves for carrying two belts.

A housing 13 rotatably supports the snake 11 and the pulley 12. During times that the clutch is not engaged, the snake 11 is stationary and a tube 14 is fixed and keyed to the pulley 12 and rotates in anti-friction bearings 15 and a brass bushing 16. The bushing 16 is supported by a flange 25. The anti-friction bearing 15 is carried in a counterbore 17 in the housing 13 and the tube 14 extends through a bore 19.

The reduced size rear end of the tube 14 terminates in a shoulder 22 which prevents the tube 14 from sliding rearwardly through the bearing 15. A sleeve 20 is fixed to the tube 14 and holds the tube 14 against inward sliding. The bearing 15 may be a plain hollow cylindrical bronze bearing and is supported in a ring 39.

The housing 13 has a web 23 extending inwardly which has threaded bores 24 therein and the flange 25 is attached to the web 23 by means of studs 26. The flange 25 has ears 27 attached thereto and these ears have rollers 28 which roll against a cam surface 29. The cam surface 29 is on the rearward end of a cam member 30 which in turn is integrally attached to a member 21. The member 21 is in the form of a ring having a groove 31 cut therein which receives a thrust bearing 32. The thrust bearing 32 is received in the groove 31 and it engages a rear surface 33 of a collar 34. The member 21 is carried on the outside of the brass bushing 16.

The collar 34 is in the form of a ring having a rear flange 35 and a forward flange 36 with a peripheral groove 37 therebetween. The collar 34 is slidably supported on a sleeve 12'. The sleeve 12' is fixed to the pulley 12 and fixed to the tube 14. A counterbore 38 is formed in the collar 34 and the counterbore 38 receives the front end of the bushing 16 and the inner ring portion 39 of the member 21, thereby positively holding them together and on the tube 14.

Spaced holes 40 and 41 are formed in the front edge of the flange 36 and some of these holes receive springs 42 and others of these holes receive bolts 43. The bolts 43 are locked in the holes 41 by means of set screw 44. The front ends of the bolts 43 slidably extend through bores 60 in the pulley 12 and threadably engage holes 45 in a ring 46. Therefore, the bolts 43 clamp the ring 46 and the collar 34 together to hold them to rotate as a unit on the outside of the tube 14 driven by the pulley 12 through the bolts 43.

A nose cone 47 is fixed to the pulley 12 by means of studs 49 which extend through spaced counterbored holes in the nose cone 47 and threadably engage holes in the pulley 12. Therefore, the pulley 12, the nose cone 47, the ring 46, and the collar 34 rotate together.

Spaced jaws 50 constitute, when assembled, a frusto-conical shaped bored member in three segments having the segments urged from each other by springs 51. The springs 51 are disposed in holes 52 in the members and a frusto-conical shaped surface 53 engages an internal counterpart surface 54 inside the nose cone 47. A base surface 55 of the clutch segments is engaged by the front surface of the ring 46.

Therefore, when a handle 57 is grasped by a ball 58 by an operator, the member 21 is rotated, causing the cam surface 29 to ride forward and around on the rollers 28, thereby forcing, through the thrust bearing 32, the collar 34, bolts 43, and ring 46 forward, forcing the jaws or clutch members 50 forward, causing them to ride inwardly on the internal frusto-conical surface 54 to squeeze the inner surface thereof into engagement with the outer periphery of the snake. Thus, the snake will be clamped to rotate with the pulley 12 and the tube 14. By releasing the handle 57, the springs 42 will force the clutch members 50 and the collar 34 backward and out of engagement with the clutch member, thereby releasing the snake.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A snake drive comprising a housing having a bearing thereon, a hollow flanged member on said housing spaced from said bearing, a tube rotatably supported in said bearing and said hollow flanged member, a cam member rotatably supported on said tube, means on said cam member to rotate it, cam means on said hollow flanged member urging said cam member axially when it is rotated, a pulley having a concentric sleeve fixed to said tube to rotate with it, a collar slidably supported on said sleeve, a ring on said tube on the side of said pulley remote from said collar, said collar being disposed between said cam member and said ring, bolt means slidably extending through said pulley and attached to said ring at one end and to said collar at the other end, a nose piece attached to said pulley and having an internal frusto-conical surface, and clutch jaws defining a frusto-conical member in said nose piece, said ring engaging said jaws to urge them into engagement with said conical surface whereby said jaws are forced to slide along said frusto-conical surface and said jaws are urged into clamping engagement with a snake adapted to be disposed in said tube whereby said snake will be clamped by said jaws to rotate with said tube and said pulley when said cam member is rotated to move said ring axially of said tube.

References Cited in the file of this patent

UNITED STATES PATENTS

| | | |
|---|---|---|
| 866,788 | Holstein | Sept. 24, 1907 |
| 2,201,733 | Kollmann | May 21, 1940 |
| 2,705,642 | Chasar | Apr. 5, 1955 |
| 2,880,435 | Deutsch et al. | Apr. 7, 1959 |

FOREIGN PATENTS

| | | |
|---|---|---|
| 324,773 | Switzerland | Nov. 30, 1957 |